(12) United States Patent
Janakiraman et al.

(10) Patent No.: US 11,748,489 B2
(45) Date of Patent: Sep. 5, 2023

(54) UNIFIED SOFTWARE LIBRARY ACCESS AND VULNERABILITY CORRECTION PRIORITIZATION

(71) Applicant: EMC IP HOLDING COMPANY LLC, Hopkinton, MA (US)

(72) Inventors: Tamilarasan Janakiraman, Hosur (IN); Kannan Subbaraman, Bangalore (IN); Vijayasarathy Vajravel, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 147 days.

(21) Appl. No.: 17/221,109

(22) Filed: Apr. 2, 2021

(65) Prior Publication Data
US 2022/0318395 A1 Oct. 6, 2022

(51) Int. Cl.
*G06F 21/57* (2013.01)
*G06F 9/455* (2018.01)

(52) U.S. Cl.
CPC ........ *G06F 21/577* (2013.01); *G06F 9/45558* (2013.01); *G06F 2009/45579* (2013.01); *G06F 2221/033* (2013.01)

(58) Field of Classification Search
CPC ............... G06F 21/577; G06F 9/45558; G06F 2009/45579; G06F 2221/033
See application file for complete search history.

(56) References Cited

U.S. PATENT DOCUMENTS

| | | | | |
|---|---|---|---|---|
| 9,323,921 | B2 * | 4/2016 | Hunt | G06F 21/53 |
| 9,971,797 | B1 * | 5/2018 | Kumar | G06F 11/1453 |
| 9,977,898 | B1 * | 5/2018 | Folco | G06F 21/53 |
| 10,116,625 | B2 * | 10/2018 | Kinder | H04L 63/0281 |
| 10,120,875 | B1 * | 11/2018 | Duggal | G06F 16/13 |
| 10,216,754 | B1 * | 2/2019 | Douglis | G06F 16/1744 |
| 10,528,745 | B2 * | 1/2020 | Li | H04L 63/1416 |
| 11,068,245 | B2 * | 7/2021 | Jaeger | G06F 8/4441 |

(Continued)

FOREIGN PATENT DOCUMENTS

WO    WO-2019245571 A1 * 12/2019 ............... G06F 9/44

*Primary Examiner* — Sharon S Lynch
(74) *Attorney, Agent, or Firm* — Anderson Gorecki LLP

(57) ABSTRACT

A container-based software implementation uses separate containers for software libraries and application code. A storage system may have multiple applications executing to control various aspects of operation of the storage system, and to enable access to the storage system by hosts. These applications are containerized separately from the libraries referenced by the applications, and the libraries are commonly housed in a separate container. The libraries may be open-source libraries, proprietary libraries, or third-party dependent libraries. A vulnerability management system scans the application containers to determine dependencies between applications and libraries, including the number of containers that reference a particular library and the frequency with which microservices of the containerized application reference the library. A vulnerability prioritization system uses the determined dependencies and vulnerability severity scores to prioritize libraries for correction based on the frequency of use of the library, the number of products impacted, and the severity of the vulnerabilities.

15 Claims, 5 Drawing Sheets

(56) References Cited

U.S. PATENT DOCUMENTS

| | | | | |
|---|---|---|---|---|
| 2005/0060722 | A1* | 3/2005 | Rochette | G06F 8/60 |
| | | | | 719/319 |
| 2012/0017213 | A1* | 1/2012 | Hunt | G06F 21/53 |
| | | | | 718/100 |
| 2015/0241548 | A1* | 8/2015 | Jones | G01S 5/0295 |
| | | | | 455/456.1 |
| 2015/0347617 | A1* | 12/2015 | Weinig | G06F 16/986 |
| | | | | 715/234 |
| 2017/0098087 | A1* | 4/2017 | Li | H04L 63/1416 |
| 2017/0372072 | A1* | 12/2017 | Baset | G06F 11/3604 |
| 2018/0121649 | A1* | 5/2018 | Folco | G06F 21/568 |
| 2018/0176245 | A1* | 6/2018 | Cornell | G06F 21/577 |
| 2018/0253558 | A1* | 9/2018 | Li | H04L 63/1433 |
| 2018/0293394 | A1* | 10/2018 | Gunda | G06F 9/45558 |
| 2018/0373551 | A1* | 12/2018 | Christensen | G06F 9/44505 |
| 2019/0042320 | A1* | 2/2019 | Prince | G06F 9/5077 |
| 2019/0079734 | A1* | 3/2019 | Kadam | G06F 8/71 |
| 2019/0103976 | A1* | 4/2019 | Chhabra | G06F 21/00 |
| 2019/0199626 | A1* | 6/2019 | Thubert | H04L 45/64 |
| 2019/0268315 | A1* | 8/2019 | Miller | H04L 9/0891 |
| 2019/0306010 | A1* | 10/2019 | Medam | G06F 9/546 |
| 2020/0142675 | A1* | 5/2020 | Jaeger | G06F 8/427 |
| 2021/0271777 | A1* | 9/2021 | Netsch | H04L 67/02 |

* cited by examiner

FIG. 4

Determining number of microservices associated with all applications that use a particular library

| Application | Number of microservices | Frequency | Impact Percentage |
|---|---|---|---|
| Storage System Management application | 4 | 3 | 75 |
| CLI Utility | 10 | 8 | 80 |
| SDNAS | 6 | 4 | 75 |
| Storage Tiering | 1 | 1 | 100 |
| Remote Replication | 12 | 3 | 25 |

FIG. 5

Report containing library, severity, and fix information – vulnerability database

| Library Name | Installed | Fixed In | Vulnerability | Severity |
|---|---|---|---|---|
| liberepo | 1.11.0-2.el8 | 1.11.0-3.el8_2 | CVE-2020-14352 | High |
| openssl-libs | 1.1.1c-15.el8 | | CVE-2020-1971 | High |
| sqlite-libs | 3.26.0-6.el8 | | CVE-2019-5827 | High |
| bind-export-libs | 9.11.13-5.el8_2 | 32:9.11.20-5.el8 | CVE-2020-8623 | Medium |
| bind-export-libs | 9.11.13-5.el8_2 | 32:9.11.20-5.el8 | CVE-2020-8619 | Medium |
| bind-export-libs | 9.11.13-5.el8_2 | 32:9.11.20-5.el8 | CVE-2020-8624 | Medium |
| bind-export-libs | 9.11.13-5.el8_2 | 32:9.11.20-5.el8 | CVE-2020-8622 | Medium |

UNIFIED SOFTWARE LIBRARY ACCESS AND VULNERABILITY CORRECTION PRIORITIZATION

FIELD

This disclosure relates to computing systems and related devices and methods, and, more particularly, to a method and apparatus for unifying software library access and prioritizing software library-based vulnerabilities for correction.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A container-based software implementation is provided which uses separate containers for software libraries and application code. A storage system may have multiple applications executing to control various aspects of operation of the storage system, and to enable access to the storage system by hosts. In some embodiments, multiple applications are containerized separate from the libraries referenced by the applications, and the libraries are commonly housed in a separate container. The libraries, in some embodiments, are open-source libraries, although proprietary or third party dependent libraries may be treated in a similar manner.

By separating the libraries from the application code, and implementing the libraries in a library container separate from the application containers, a library filesystem is able to be created which can be continuously scanned for vulnerabilities. Additionally, since new libraries can be added to the library container, if a new product is created or if an existing product is updated and requires the use of a new library, the new library can simply be added to the library container.

Once the libraries are identified, a continuous vulnerability check is performed on the set of libraries to understand the severity and relationship among the open source libraries. If a library needs to be replaced, the library can be replaced in the library container, which enables a single replacement to fix the vulnerability across all of the applications which are using the specific library. Additionally, the entire process can be carried out without the need of repackaging the application containers.

In some embodiments, a vulnerability tracking system is provided which prioritizes vulnerabilities to be fixed based on a vulnerability scoring system. This scoring system, in some embodiments, is based on the number of unique vulnerabilities in a version of the library, the frequency of use of the library in products configured to execute on the storage system, the number of products impacted, and the severity of the vulnerabilities.

BRIEF DESCRIPTION OF THE DRAWINGS

FIG. 4 is an example data structure that is created for each software library, and used to determine the number of microservices associated with all applications that use that particular software library, according to some embodiments.

FIG. 5 is an example data structure showing a collection of vulnerabilities associated with software libraries, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
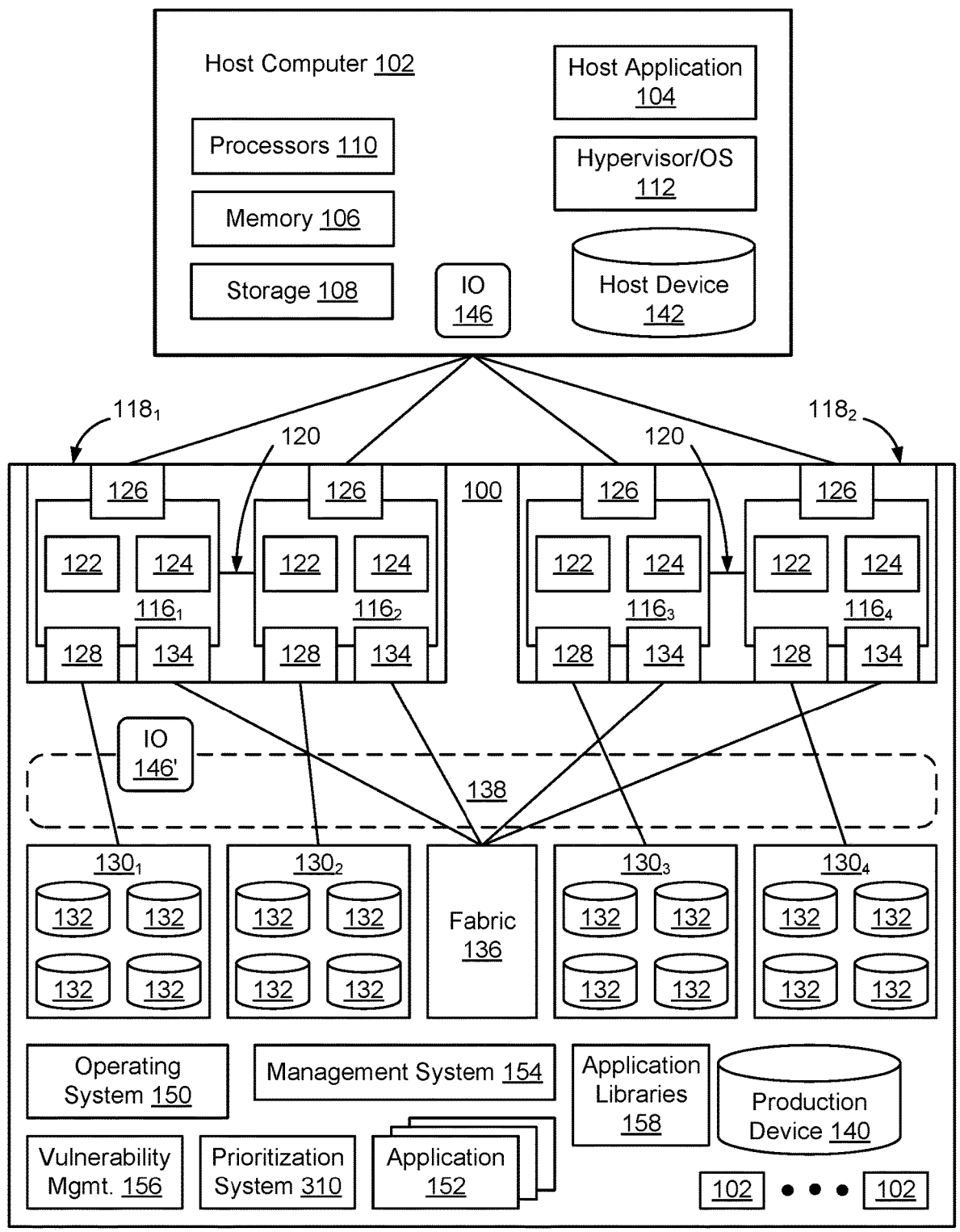
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied 146' into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written 146' into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Storage systems 100 include an operating system 150 and numerous applications 152 that are used to control operation of the storage system 100, access to data stored in managed drives 132, replication of data between storage systems 100, and to perform many other functions. One example application 152 might be a Fully Automated Storage Tiering (FAST) application designed to move data between storage tiers, so that the most frequently accessed data is stored in uncompressed form on faster storage devices. Another example application 152 might be a Software Defined Network Attached Storage (SDNAS) process, configured to enable hosts to connect to the storage system and access storage remotely on a network. Another example application 152 might be a Remote Data Forwarding (RDF) application configured to enable data stored on managed drives 132 to be synchronously or asynchronously replicated to another similarly configured storage system 100. Another example application might be a management system 154. A storage system might have hundreds or more applications 152, depending on the implementation.

Many of the applications/products (software) that are developed to run on a storage system 100 are dependent on libraries, which may be proprietary libraries, open-source libraries, or other third-party libraries. For ease of explanation, an implementation will be described in which the libraries are open-source libraries, although it should be understood that other forms of libraries can be used in addition to open-source libraries.

When an application is being created, or modified, open-source libraries are picked by developers and then built (Run-Time), packed alongside the products. These libraries pose a real threat when vulnerabilities are subsequently detected. Typically, vulnerabilities are identified by a company's product security personnel, who will alert the developers to enable the developers to address the newly discovered vulnerability. Different applications may use different open-source libraries, although a given library may be used by multiple application types and multiple instances of the same application. If a vulnerability is discovered, the applications contained in the application repository need to be scanned to determine if any of the applications are affected by the vulnerability. When an application is identified that relies on the library, the application needs to be corrected to solve for the vulnerability.

This presents a complex environment, which requires a security system to keep track of all the code (and its open-source libraries) which exists across different version control systems or artifact databases. Unfortunately, there is no method or system which organizes/clusters the open-source libraries used by the organization which can be frequently scanned against vulnerabilities. Also, if an application is to be upgraded, for example in response to a detected vulnerability in one of the libraries referenced by the application, implementation of the upgrade requires a complex upgrade process that can require intervention from both the product development team and the security team to address, verify, repackage and publish the upgrade to customers.

In some embodiments, a container-based software implementation is provided which uses separate containers for software libraries and application code. A storage system may have multiple applications executing to control various aspects of operation of the storage system, and to enable access to the storage system by hosts. In some embodiments, multiple applications are containerized separate from the libraries referenced by the applications, and the libraries are commonly housed in a separate container. The libraries, in some embodiments, are open-source libraries, although proprietary or third party dependent libraries may be treated in a similar manner.

By separating the libraries 158 from the application code 152, and implementing the libraries 158 in a library container separate from the application containers, a library filesystem is able to be created which can be continuously scanned for vulnerabilities. Additionally, since new libraries 158 can be added to the library container, if a new product is created or if an existing product is updated and requires the use of a new library, the new library 158 can simply be added to the library container.

Once the libraries 158 are identified, a continuous vulnerability check is performed by a vulnerability management system 156 on the set of libraries 158, to understand the severity of the vulnerability and how frequently the library is used on the set of applications 152. If a library needs to be replaced, the library can be replaced in the library container, which enables a single replacement to fix the vulnerability across all of the applications which are using the specific library. Additionally, the entire process can be carried out without the need of repackaging the application containers.

In some embodiments, a vulnerability management system 156 is provided which prioritizes vulnerabilities to be fixed based on a vulnerability scoring system. This scoring system, in some embodiments, is based on the number of unique vulnerabilities in a version of the library 158, the frequency of use of the library 158 in products (applications 152) configured to execute on the storage system 100, the number of products impacted, and the severity of the vulnerabilities.

In some embodiments, the same space that is used to implement currently used open-source libraries is also utilized for future open-source libraries, which avoids the need to upgrade the whole application 152 as a package. Accordingly, if a vulnerability is detected in an open-source library 158, the vulnerability can be fixed and the previous open-source library can be replaced with the new version of the open-source library. Since the application 152 and open-source libraries 158 are packaged and shipped as separate containers, it is therefore possible to decouple fixing vulnerabilities associated with the open-source libraries 158 from hot fixing the applications 152. Finally, since the library container is able to be used by all applications 152 and all instances of an application 152 executing on the storage system 100, it is possible to unify software library access, to ensure that a standard version of the library 158 is adopted across all applications 152 that depend on that library 158 and that are configured to execute on the storage system 100.

Figure 2:
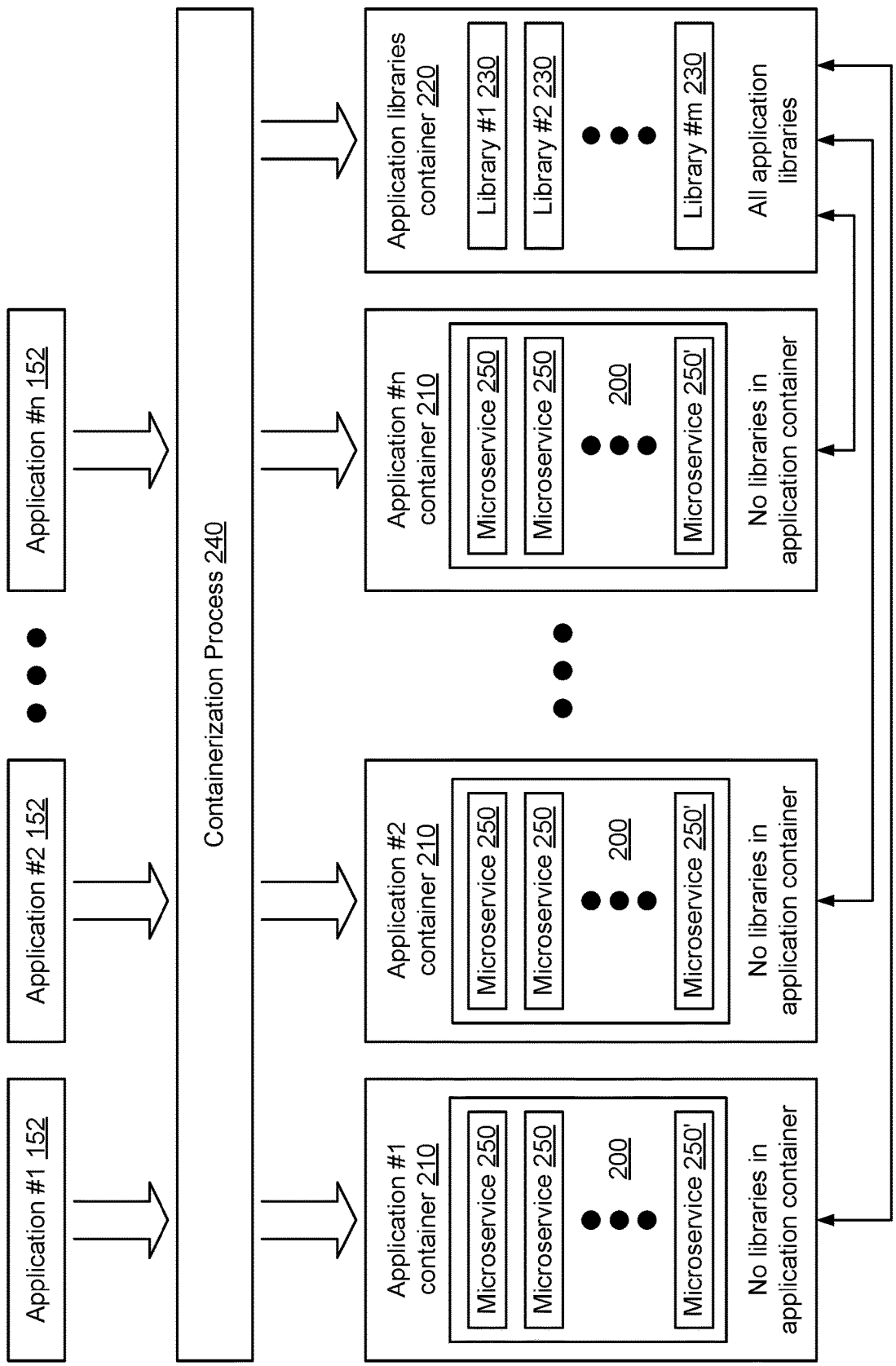
FIG. 2 is a functional block showing a process of creating containerized applications, in which the applications and the libraries referenced by the applications are implemented using separate containers, according to some embodiments.

FIG. 2 is a functional block diagram showing a process of creating containerized applications, in which the application code 200 and the libraries 230 referenced by the applications 200 are implemented using separate containers 210, 220, according to some embodiments. As shown in FIG. 2, applications 152 are created and passed to a containerization process 240. An example containerization process 240 is Docker™, which is a set of platform as a service products that use OS-level virtualization to deliver software in packages called containers. Conventionally, containers are isolated from one another and bundle their own software, libraries and configuration files. However, as discussed in greater detail herein, rather than having the application containers 210 include all of the libraries 230 required by the applications 200, a separate library container 220 is used such that the application containers 210 include only the application software 200 and configuration files. Thus, as shown in FIG. 2, each application 152 gets split into two containers—one container 210 holds the application files 200 and the other container holds the open-source libraries 230. As shown in FIG. 2, a single shared library container 220 may be used to hold open-source libraries for multiple applications 200 and multiple instances of the same application 200.

In some embodiments, applications are implemented using microservices 250. Microservices 250 enable an application to be structured as a collection of independent services. Often, microservices are created to perform particular tasks. Within the application 200, the microservices 250 are loosely coupled and are configured to communicate seamlessly with each other. Each of the microservices 250 of a given application may reference one or more of the libraries 230 in the library container 220. In some embodiments, one of the microservices 250' is a library access microservice, configured to implement the library access processes for each of the other microservices of the application 200.

Figure 3:
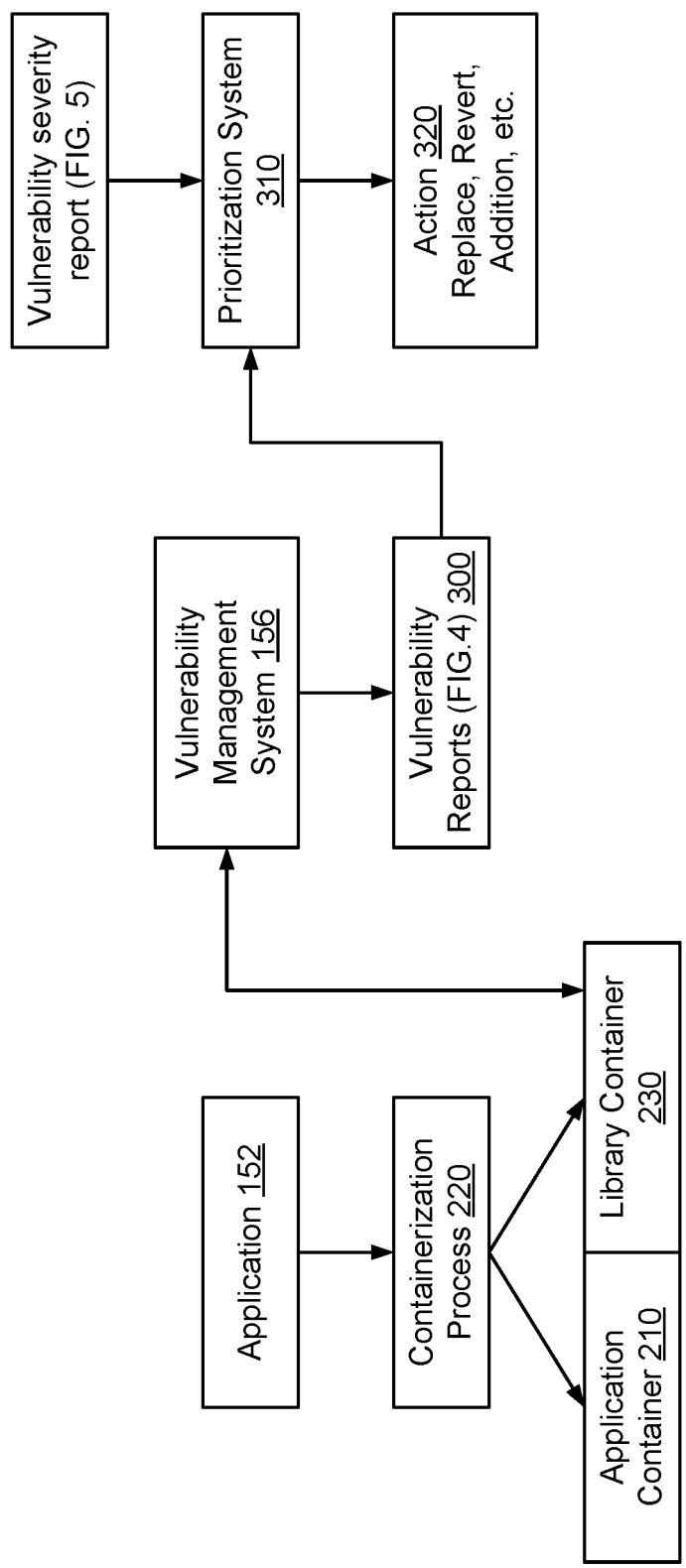
FIG. 3 is a flow diagram showing creation of applications using separate application and library containers, and a process of continuously checking for library-based vulnerabilities, according to some embodiments.

FIG. 3 is a flow diagram showing creation of applications using separate application and library containers, and a process of continuously checking for library-based vulnerabilities, according to some embodiments. As shown in FIG. 3, once the applications have been implemented in containers separate from the library container, the applications are scanned by a vulnerability management system 156 to determine library dependencies of each of the applications. A report, for each library, is then created identifying the set of applications that use the library and the frequency with which the applications use the library. An example library usage report is shown in FIG. 4. A library usage report is also referred to herein as a "vulnerability report". In some embodiments, the vulnerability reports specify both the frequency with which the library appears in application products as well as the number of products that use the library. The vulnerability reports are used, in connection with vulnerability severity reports, by a prioritization system 310 (See FIG. 1) to identify and prioritize libraries to be fixed.

To generate a vulnerability report, in some embodiments the vulnerability management system determines which products and which microservices of the products reference each of the various open-source libraries. Microservices 250 may reference one or more of the open-source libraries 230. Example library addresses might be, for example, /opt/dellemc/bin/; /opt/dell/bin/; opt/dell/lib, etc. In some embodiments, the vulnerability management system 156 scans each product to generate a list of open-source libraries that each product is dependent upon. The number of times a particular open-source library is used in a microservice of a product determines its frequency. For example, a Command Line Interface (CLI) utility such as the Linux utility "ldd" may be used to determine the shared library dependences of an executable or of a shared library.

The vulnerability management system then generates a vulnerability report for each library 158, identifying which products reference the library and the frequency with which the microservices of the product reference the library.

FIG. 4 shows an example data structure that is created for each software library, and used to determine the number of microservices associated with all applications that use a particular library. As shown in FIG. 4, in some embodiments each application is scanned and the number of microservices that use the library are identified. The frequency with which the microservices use the library is also determined. The number of products using the library and the number of microservices using the library determines the impact percentage.

In some embodiments, a dictionary is maintained that contains the details of all product specific containers that use open-source libraries. For each container, a report is formed identifying the libraries used by that container. For each library, a report is then formed, such as the report shown in FIG. 4, which gathers together the dependencies of each of the applications that rely on the library. By doing this, it is possible to determine the frequency with which each library is used on set of applications configured to execute on the storage system.

FIG. 5 is a data structure containing a collection of known vulnerabilities. As shown in FIG. 5, each vulnerability entry identifies the name of the library, when the library was installed, when the library was last fixed, the identity of the vulnerability, and the severity of the vulnerability. The identity of the vulnerability and the severity, in some embodiments, is based on the Common Vulnerability Scoring System (CVSS) score. CVSS scores provide a 0-10 rating on the severity of an information security vulnerability, which is available from the National Vulnerability Database maintained by the US government's National Institute of Science and Technology.

As vulnerabilities are discovered in the libraries, the vulnerability report (see FIG. 5) is updated and used by the prioritizing system 310, together with the vulnerability reports 300, to prioritize vulnerabilities to be corrected. In some embodiments, the prioritization system 310 uses a weighted prioritization process to rank vulnerabilities, which considers the severity of the vulnerability, the frequency with which the library is used by the microservices of the set of applications, and the overall product coverage—how many of the applications designed to execute on the storage system reference the library.

In some embodiments, the prioritizing system 310 uses the following algorithm to prioritize the vulnerabilities listed in the vulnerability severity report of FIG. 5 for correction:

Vulnerability Priority=(Vulnerability Severity Score*Weight VSS)+(Vulnerability Frequency Ratio*WeightVFR)+(Vulnerability Product Coverage*WeightVPC).

In this manner, the frequency that a library is used by the applications and the percentage of applications which refer to a particular library can be used to prioritize known vulnerabilities for correction. For example, if vulnerability #1 is associated with a library that is frequently referenced by multiple products on the storage system, it may be preferential to resolve vulnerability #1 before resolving the other vulnerabilities, even if the other vulnerabilities are more severe. However, if two vulnerabilities have similar frequency scores, but one of the vulnerabilities is more severe (e.g. based on CVSS score) the more severe vulnerability may be preferentially selected for resolution before the less severe vulnerability is corrected.

In some embodiments, the dictionary of containerized applications is used to periodically scan each of the applications to determine the set of libraries used by those applications. After each scan, a set of reports identifying the libraries installed and the frequency with which the libraries are used by microservices of the applications is provided to the prioritization system 310. The prioritization system 310 determines which of the libraries have one or more known vulnerabilities from the vulnerability severity report, such as the vulnerability severity report shown in FIG. 5. The prioritization system then generates a priority score for each identified vulnerability to prioritize resolution of the vulnerabilities. Action 320 may then be taken to resolve the vulnerability, which might include replacing the library, reverting the library to an earlier version, adding one or more libraries to the library container 220, or implementing another correction to eliminate or reduce the severity of the vulnerability. Since the action 320 is able to be taken on the library in the library container 220, the action will correct the vulnerability across all products and microservices that reference the library, without requiring adjustment to the applications 200 contained in application containers 210.

In some embodiments, the priority score for a given vulnerability is implemented as a number between 0 and 1. Since the CVSS score provides a value of between 0 and 10, to normalize the CVSS score, in some embodiments, the vulnerability severity score is calculated by taking the CVSS score and multiplying the CVSS score by 0.1. The vulnerability severity score is then multiplied with a weighting factor, WeightVSS, which in some embodiments is set to 60%. Other implementations may use other weight values, and the 60% value is provided merely as an example.

The vulnerability frequency ratio, in some embodiments, is calculated by determining the number of impacted bins and libs in all products, divided by the total number of bins and libs in all products. The vulnerability frequency ratio provides a number between 0 and 1, which is multiplied with a weighting factor, WeightVFR. In some embodiments, the weighting factor WeightVFR is set to 25%, although other implementations may use other weight values, and the 25% value is provided merely as an example.

The vulnerability product coverage factor, in some embodiments, is calculated by determining the number of products impacted by the vulnerability (e.g. the number of products that rely on the library), divided by the total number of products instantiated on the storage system. The vulnerability product coverage provides a number between 0 and 1, which is multiplied with a weighting factor, WeightVPC. In some embodiments, the weighting factor WeightVPC is set to 15%, although other implementations may use other weight values, and the 15% value is provided merely as an example.

The prioritization system 310 thus uses the severity of the vulnerabilities associated with a particular library, the frequency with which the library is used by microservices of the applications, and the percentage of products on the storage system that use the library, to generate priority scores that enable vulnerabilities to be prioritized for correction.

As a hypothetical example, assume that there are several vulnerabilities that have been identified in a particular open-source library, and that several products of instantiated on a storage system reference the open-source library. The vulnerability management system 156 will scan all products of the storage system 100, and generate a vulnerability report 300 for the library. Table 1 shows hypothetical results of a scan of all application containers:

| | |
|---|---|
| Number of products impacted | 5 |
| Total number of products | 10 |
| Number of bins/libs impacted in all products | 90 |
| Number of bins/libs in all products | 200 |
| CVSS scores of the 10 known vulnerabilities in the selected library: {2.5, 3, 4, 5.5, 6.7, 6.9, 7.9, 8.3, 8.9, 9.1} | Average CVSS score = 62.8/10 = 6.28 |

As noted above, in some embodiments the Priority Score=(Vulnerability severity score*Weight VSS)+(Vulnerability frequency ratio*Weight VFR)+(Vulnerability Product Coverage*Weight VPC). Based on these values, the Priority Score for the vulnerability=(6.28*0.1)*0.6+(90/200)*0.25+(5/10)*0.15=0.5643.

The prioritization system thus assigns a priority score to each library, so that developers assigned to fix vulnerabilities are able to prioritize which libraries to select for repair. In some embodiments, any vulnerability above a threshold, such as a priority score above 0.33, is flagged for immediate attention.

By separating open-source libraries from application code, and placing the applications in separate containers from the open-source libraries, it is possible to maintain one version of each open-source library for use by all applications on the storage system. This enables vulnerabilities discovered in the open-source libraries to be corrected once, at the library container, and have the new library used by all existing products without requiring modification of any of the application containers. Further, by scanning the application containers to determine which libraries are used by which products, and the frequencies with which the libraries are used by the microservices implementing the applications, it is possible to prioritize correction of vulnerabilities based not only on the vulnerability severity, but also on the impact of the vulnerability across the set of applications on the storage system.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of unifying software library access and prioritizing software library-based vulnerabilities for correction, the computer program including a set of instructions which, when executed by a computer, cause the computer to perform the steps of:
   creating a shared library container by a containerization process, the shared library container containing a set of libraries but not executable application code;
   creating a set of application containers by the containerization process, wherein each application container is an independent container, separate from the shared library container, and contains one or more applications implemented as executable application code for execution on an operating system of a storage system and configuration files, but not any library of the set of libraries that are contained in the shared library container, wherein at least some of the executable application code contained in the set of application containers reference one or more of the libraries contained in the shared library container;
   determining severity values of known vulnerabilities associated with each of the libraries in the shared library container;
   for each library in the shared library container, determining a percentage of the applications that use the library and a frequency with which the applications use the library; and
   replacing one of the libraries in the shared library container to correct a vulnerability identified in the one of the libraries, without modifying the application code in any of the application containers.

2. The non-transitory tangible computer readable storage medium of claim 1, further comprising scanning the set of application containers to identify which application containers contain applications that reference a particular library in the shared library container.

3. The non-transitory tangible computer readable storage medium of claim 2, further comprising determining a number of times the particular library is referenced by all of the applications contained in all of the application containers.

4. The non-transitory tangible computer readable storage medium of claim 2, further comprising determining a severity of a vulnerability associated with the particular library, and determining a priority value for correction of the vulnerability based on the severity of the vulnerability and the number of times the particular library is referenced by all of the applications contained in all of the application containers.

5. The non-transitory tangible computer readable storage medium of claim 4, wherein the priority value is based on a percentage of the applications that reference the particular library.

6. The non-transitory tangible computer readable storage medium of claim 1, further comprising assigning library prioritization values to each of the libraries using a weighted prioritization process, the weighted prioritization process assigning a library prioritization value to each particular library based on a first weight value times the severity values of the known vulnerabilities of that particular library, a second weight value times the percentage of applications that use that particular library, and a third weight value times the frequency with which the applications use that particular library.

7. The non-transitory tangible computer readable storage medium of claim 1, further comprising generating a vulnerability report, for each library in the shared library container, identifying a set of applications that use the library and a frequency with which the applications use the library.

8. The non-transitory tangible computer readable storage medium of claim 7, wherein the applications are implemented using microservices, and wherein the frequency with which a particular application uses the library is based on how many microservices of the particular application use the library.

9. The non-transitory tangible computer readable storage medium of claim 1, wherein the libraries are open-source libraries.

10. The non-transitory tangible computer readable storage medium of claim 1, further comprising adding a new library to the shared library container.

11. The non-transitory tangible computer readable storage medium of claim 1, wherein at least two of the applications in separate application containers share access to a particular library in the shared library container by referencing the particular library in the shared library container.

12. A storage system, comprising:
   a processor;
   a set of storage resources including a memory;
   an operating system;
   a shared library container created by a containerization process, the shared library container containing a set of libraries but not executable application code;
   a set of application containers created by the containerization process, wherein each application container is an independent container, separate from the shared library container, and contains one or more applications implemented as executable application code for execution on the operating system of the storage system and configuration files, but not any library of the set of libraries that are contained in the shared library container, wherein at least some of the application code contained in the set of application containers reference one or more of the libraries contained in the shared library container;
   a vulnerability management system containing first control logic configured to determine severity values of known library-based vulnerabilities associated with each of the libraries in the shared library container, and for each library, determine a percentage of the applications that use the library and a frequency with which the applications use the library; and
   a vulnerability prioritization system configured to select and replace one of the libraries in the shared library container to correct a vulnerability identified in the one of the libraries, without modifying the application code in any of the application containers.

13. The storage system of claim 12, wherein at least some of the applications are implemented using microservices.

14. The storage system of claim 13, wherein one of the microservices is a library access microservice configured to execute library calls on the shared library container.

15. The storage system of claim 12, wherein the vulnerability prioritization system containing second control logic configured to assign a respective library prioritization value to each of the libraries using a weighted prioritization process, the weighted prioritization process configured to assign a library prioritization value to each particular library based on a first weight value times the severity values of the known vulnerabilities of that particular library, a second weight value times the percentage of applications that use that particular library, and a third weight value times the frequency with which the applications use that particular library.

* * * * *